3,686,049
METHOD OF MAKING COILED FILAMENT MAT

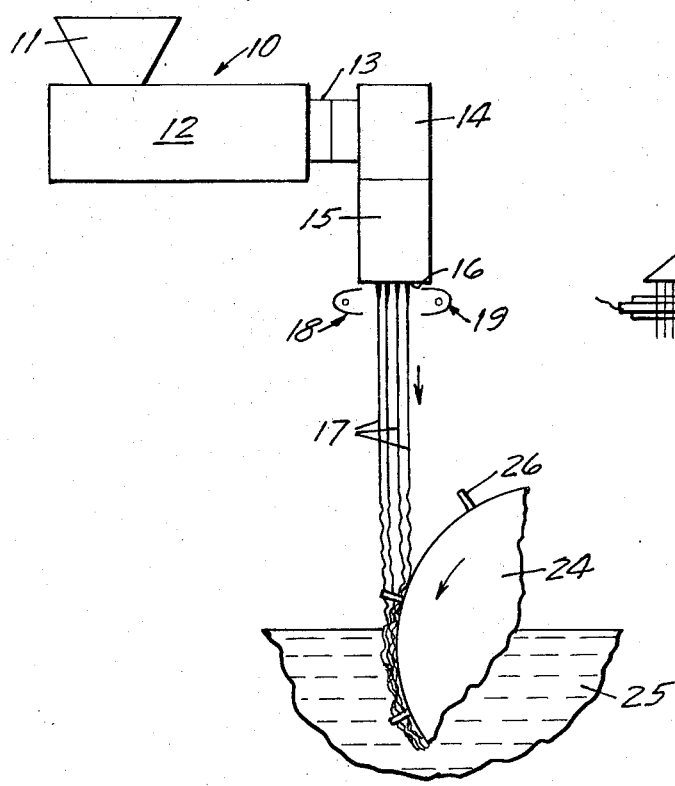
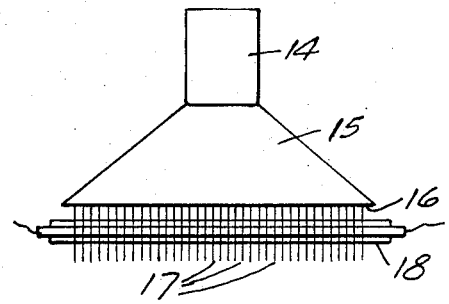
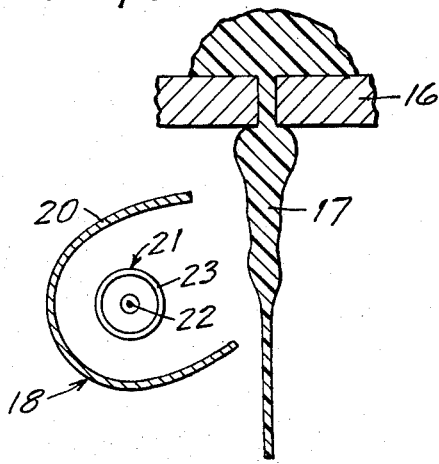

Warren R. Manner, North St. Paul, and Richard J. Kinderman, Maplewood, Minn., assignors to Minnesota Mining and Manufacturing Company, St. Paul, Minn.
Filed July 3, 1969, Ser. No. 838,848
Int. Cl. D04h *1/70, 3/16*
U.S. Cl. 156—167                 3 Claims

ABSTRACT OF THE DISCLOSURE

Open mats of interbonded continuous coiled filaments are produced by preheating the continuously advancing filaments, e.g. as they leave the extruder and preferably by exposure to intense infra-red radiation, and then permitting brief free fall before rigidifying the filaments and supporting the mat in a quench bath.

---

This invention relates to a method for the manufacture of open mats of interbonded coiled plastic filaments in any desired length. The resulting product finds utility as an easily cleaned and wear-resistant walkway surfacing, for example as outdoor mattings or carpetings for use around swimming pools or the like, and for other purposes.

Extruded polymeric filaments are ordinarily found to have a larger initial diameter than the orifices from which they are produced. Reducing the orifice diameter in an effort to obtain smaller filament diameters is ineffective for this reason, and is undesirable both because of the mechanical difficulties in producing such orifices and because of unavoidable plugging. Extrusion at higher temperatures is not effective since increase in diameter following extrusion still persists; and, even more importantly, many polymers cannot withstand the higher temperatures for any considerable period of time without excessive degradation. Small-diameter filaments are readily produced by mechanical stretching or attenuation following extrusion but the practice is not applicable to the formation of matted webs of interbonded crinkled monofilaments such as may be produced by methods involving free fall, wherein the continuously advancing filaments are permitted to fall against a supporting surface under their own weight.

It has now been found possible to employ relatively large-diameter extrusion orifices and to extrude at moderate temperatures while still obtaining small-diameter continuous filaments under free fall conditions which permit the recovery of the filaments in the form of integral springy or resilient open mats. The filaments fall against a supporting surface from a distance sufficient to permit the individual streams to coil or wander, much as a thin stream of honey or molasses poured into a pan will move about instead of falling in a straight line to a fixed spot. The freshly formed mat itself may appropriately serve as the supporting surface. Bonding between filaments at their points of contact is achieved, to an extent sufficient to form an integral mat structure while still permitting separation of the mat into individual filaments. The filaments are curled or crinkled into a sinuous, looped or coiled condition and are intermingled in a manner to impart further integrity to the mat structure.

A particular advantage is the ability to prepare mats of any desired length, the operation at moderate temperatures permitting continuous extrusion for any desired length of time without degradation of polymer and therefore without interruption of extrusion by plugging of screens or orifices.

The techniques is applicable also to the production of continuous integral coiled filament mats from preformed filaments, permitting the intermingling of filaments of various colors or otherwise differing in appearance to achieve novel decorative effects. Coated filaments, having a thermoplastic coherent coating on a high tensile strength core, may likewise be softened sufficiently by the methods of this invention to permit coiling and interbonding under free fall conditions into an integral open mat.

These and other improvements and advantages are made possible by heating the monofilaments under free fall conditions, preferably as they issue from the extrusion head and by exposing them to infra-red radiation.

In the drawing,

FIG. 1 is a schematic illustration in partial side elevation, and FIG. 2 in partial front elevation, of apparatus employing the method of the invention, and FIG. 3 is a schematic illustration in partial cross-sectional elevation showing the formation and attenuation of a single filament.

In practicing the invention using the apparatus illustrated, polymer in pellet or crumb form is fed into the hopper 11 of the extruder. The polymer mass is heated and blended in the barrel 12 of the extruder and is forced through screening section 13, into the adapter 14, and thence into the die block 15. The die plate 16 forming the outlet of the block 15 is provided with perforations through which the polymer is extruded as continuous monofilaments 17, the perforations being arranged in rows as indicated in the drawing.

Just below and at both sides of the die plate 16 are located twin infra-red radiators 18, 19, shown in FIG. 3 to comprise a curved reflector 20 and a tubular lamp 21 having a coiled filament 22 within a quartz envelope 23. A protective quartz window may cover the open side of the reflector, and protective cooling means may be provided for the lamp assembly. The lamps produce high intensity infra-red radiation which is directed upon the monofilaments just below their point of exit from the plate 16. Under the weight of the unsupported section, the filament promptly attenuates and is reduced in diameter, as indicated schematically in FIG. 3.

The filaments are permitted to fall freely for a distance usually of several inches, at which point they may contact the slowly advancing smooth surface of a drum 24 rotating within a quench bath 25, for example of water. The drum is preferably provided with radial supporting pegs 26. As the filaments enter the quench bath they cool and rigidify, thereby setting up a degree of resistance to free fall so that the streams are caused to oscillate beginning at a point some distance above the bath surface. The resulting wavy motion establishes intermingling with irregular periodic point contact between the still soft and coherent filaments, causing spot welding at such points. Some of the outer filaments also come into contact with the smooth surface of the drum 24 and are thereby prevented from oscillation in that direction. The drum rotates at a predetermined surface speed which is substantially lower than the speed of advance of the filaments, for example from about one-fifth to about one-twentieth of that speed. The pegs 26 assist in supporting and retarding the mat as it descends into the quench bath. Alternatively the mat may be retained on or between supporting surfaces disposed just beneath the surface of the bath, so that uniform curling or looping of the filaments is achieved at both sides of the mat. The loose open mat is slowly withdrawn through and from the bath and permitted to dry.

Heating of the plastic material is achieved by absorption of the radiant energy supplied by the lamps. Sufficient absorptivity exists with most plastic materials to provide fully effective heating, but may be increased if desired by incorporation of more highly absorptive materials, e.g. in the form of dyes or pigments, or by exposure to radiations at some more favorable wavelength. Other means of heating, such as by electromagnetic induction or by exposure to heated gases or vapors, are contemplated but involve more complicated and costly apparatus, and hence heating with infra-red radiation is preferred.

The following specific example will further illustrate the practice of the invention which however is not to be construed as limited thereto.

The die plate 16 carries four rows of apertures each 20 mils in diameter, arranged in four rows of 143 apertures per row. Within the rows the apertures are spaced on 125 mil centers; the rows are spaced at 200 mils. The lamps have an active coiled filament length of 25 inches, with an output of 153 watts/inch.

The polymer employed is plasticized polyvinyl chloride, containing 57.5% of medium molecular weight polymer and 42.5% of dioctyl phthalate plasticizer, together with small amounts of stabilizers and other modifiers. A typical material answering this description is available as "Geon Plastic 8813." Extrusion is accomplished at a temperature within the die block of 312–316° F. and a pressure of 500–700 lbs./sq. in.

The extrusion die plate is about 8–10 inches above the level of the water in the quench bath, the exact distance being a function of the desired mat structure. The lamps irradiate the filaments at a plane approximately 1–1½ inches below the plate. The roll 24 has a four inch diameter and is fitted with ⅛ inch radial pegs at a spacing of one inch.

Under the conditions given, the feed rate is 140–150 lbs./hr. The mat product weighs 3 to 3½ lbs./sq. yd. at a thickness slightly less than one-half inch. The filaments measure 15 to 20 mils in diameter.

The filaments are bonded together sufficiently so that the mat may be removed from the quench bath, dried and subjected to a reasonable degree of handling without filament separation; but the individual filaments may be separated from the mat in continuous lengths by careful hand manipulation. Improved bonding may be achieved by a subsequent treatment of the mat with bonding and impregnating agents. A preferred agent is polyvinyl chloride plastisol, applied to the extent of 15–20 percent of the total weight and cured or set by heating at about 300° F. Particularly when thus treated, the mat serves as an easily cleaned, flexible and conformable, long-lasting outdoor carpeting. It may be produced in various colors and in any desired lengths.

Using similar apparatus, materials and operating conditions, and measuring the temperature with an optical pyrometer sensitive over the 7–10 micron range, the indicated temperature of the extruded filaments without irradiation is found to drop from 290–300° F. at the extruder to 250–260° F. at a level about two inches above the quench bath. When post-heated by irradiation, the indicated temperature of the filaments at corresponding locations is 355–365° F. and 300–310° F. respectively. Attempts to operate the extruder at temperatures of 350–360° F. with this same vinyl plastic result in rapid degradation of the material and plugging of the die within not longer than one or two hours of continuous operation; whereas under the conditions described, continuous operation for several days is achieved without plugging.

The diameter of the filaments obtained in the example is given as 15 to 20 mils. In a more precise determination the average diameter of the filaments produced under post-heating conditions is 17.3 mils with the roll 24 rotating at slow speed, and 16.4 mils at double that speed; whereas filaments similarly made but without irradiation measure 24.5 mils and 25.4 mils respectively. In the first case, the average length of a single monofilament in one inch of mat is 20 inches at slow speed and 6 inches at the higher speed; whereas without the post-heating, filament lengths are 6 inches and 2 inches respectively.

What is claimed is as follows:

1. Method of making a resilient looped high void volume mat of interbonded continuous coiled small-diameter filaments comprising the steps of:

extruding a hot filament-forming extrudable thermoplastic polymeric material in the form of a bundle of closely-spaced separate continuous filaments, permitting said bundle of separate filaments to free-fall under their own weight toward the surface of a liquid quench bath, softening the extruded, free-falling filaments by continuously briefly heating said bundle of separate filaments to a condition where the softened filaments are attenuated while free-falling, allowing the free-falling attenuated filaments to fall onto a supporting surface and into said quench bath and thus forming an integral mat by permitting a looping, coiling, intermingling and bonding of the softened filaments, and continuously removing said integral mat from said quench bath and supporting surface.

2. Method of claim 1 wherein said extrusion proceeds at a moderately elevated temperature which is insufficient to cause observable degradation of the thermoplastic material.

3. Method of claim 1 wherein said continuously briefly heating is accomplished by exposure of said monofilaments to intense infra-red radiation.

References Cited

UNITED STATES PATENTS

| | | | |
|---|---|---|---|
| 2,746,086 | 5/1956 | Vickers | 156—167 |
| 2,940,886 | 6/1960 | Nachtman | 156—167 X |
| 3,080,611 | 3/1963 | Jarrett et al. | 156—167 |
| 3,148,101 | 9/1964 | Allman, Jr. et al. | 156—167 |
| 3,288,582 | 11/1966 | Wong et al. | 156—167 |
| 3,333,040 | 7/1967 | Nakahara | 156—167 X |
| 3,423,266 | 1/1969 | Davies et al. | 156—181 X |
| 3,439,085 | 4/1969 | Hartmann | 156—167 X |
| 3,522,025 | 7/1970 | Smith | 156—183 X |
| 3,539,676 | 11/1970 | Polestak | 264—176 F |
| 3,549,741 | 12/1970 | Caison | 264—176 F |

FOREIGN PATENTS

| | | | |
|---|---|---|---|
| 1,284,114 | 1/1961 | France | 156—167 |

CARL D. QUARFORTH, Primary Examiner

R. S. GAITHER, Assistant Examiner

U.S. Cl. X.R.

156—161, 181, 229, 441; 264—176 F, 168, 208